Patented Feb. 2, 1932

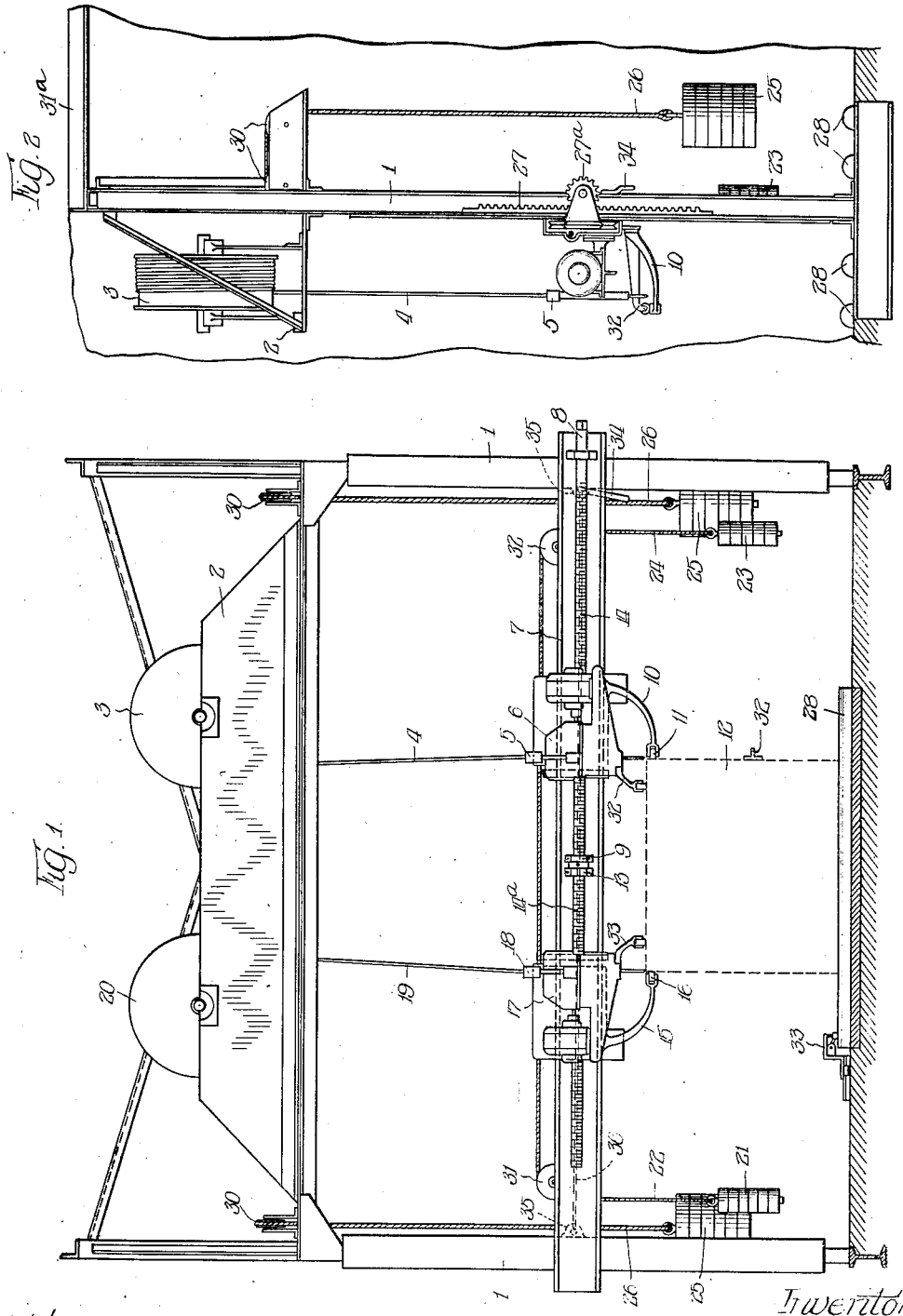

1,843,185

UNITED STATES PATENT OFFICE

RAY B. WEEKS, OF CLEVELAND, OHIO, ASSIGNOR, BY MESNE ASSIGNMENTS, TO THE WAYNE PUMP COMPANY, OF BALTIMORE, MARYLAND, A CORPORATION OF MARYLAND

WELDING DEVICE

Application filed May 5, 1927. Serial No. 189,123.

The invention pertains to welding, and more particularly to a novel and self-adjusting device for accurately and expediently welding an article of any shape by passing the article once through the device.

It is an object of the invention to produce a simple device, inexpensive to build and operate, and of such character that it will automatically adjust itself to any shaped object during a continued welding operation.

Another object is to provide guiding means for the welding tools whereby they will evenly and adjustingly weld a seam at a predetermined place on any article without interrupting the operation of the machine.

Still another object is to provide a machine which will entirely weld an article on a single trip through the machine and this without regard for the shape of the article.

A further object is to provide a machine to completely weld an article of any shape along predetermined lines by passing the article only once through the machine.

Other and more specific objects will readily occur from the detailed description and drawings appended hereto.

In the drawings, wherein like reference characters are used to designate like parts—

Figure 1 is an elevation of a single welding unit of the device; and

Figure 2 is a side elevation of the single unit shown in Figure 1.

It will be understood that as it is contemplated to provide four similar units fastened together at predetermined points to form the device, that a description of one of said units will suffice for all.

A frame comprising uprights 1 made of any convenient material, such as structural steel shapes tied together by suitable cross construction 2, is adapted to carry drums 3 and 20 on said cross construction, on which the feeding apparatus of the welding tools is carried. In the case shown, this apparatus includes a welding device, this apparatus includes a wire or conductor energized from any convenient source (not shown), although it will be understood and appreciated that any form of welding tools may be employed, either utilizing said drums or not, depending upon the type, as this type is not the gist of the invention. Between these uprights there is provided a movable cross member 7, which member is counterbalanced by weights 25 fastened thereto by any suitable flexible means, such as the rope 26 passing over pulleys 30. This cross member is provided with two saddles or welding heads 6 and 17, each carrying a welding tool 5 and 18, respectively, attached to its respective energizing or conductor means 4 and 19. These saddles are loosely mounted for free movement on the cross member and are each provided with counterweights, the member 6 being provided with the counterweight 21 fastened thereto by the flexible means 22 passing over the pulley 31, and the saddle 17 being provided with a similar counterweight 23 fastened thereto by the flexible means 24 passing over the pulley 32, said counterweights tending to draw the saddles toward each other.

The saddles are kept from approaching too close to each other by means of stops 9 and 13 mounted on oppositely threaded portions 14 and 14a respectively of the stop operating member 8 mounted on the cross member 7 and adapted to be operated from one end thereof. The saddles are also provided with adjustable guiding means comprising arms 10 and 15 provided with rollers 11 and 16 for slidingly contacting sides of the article 12 to be welded. The saddles may also be provided with similar adjustable arms 32 and 33 adapted to have a similar vertical guiding effect on the welding tool by contacting the top of the container. The cross member 7 may be locked in a fixed position on the uprights of the frame by any convenient means, as indicated by the operating handle 34, which serves to lock members 35 provided on either side of the cross bar, by any convenient and well-known means, such as a series of links, etc., as indicated at 36. The cross member 7 is adapted to be vertically adjustable to any position by any means, such as the rack and pinion 27 and 27a, one of which is provided for the cross member and the other of which is provided for the upright, and being actuated by any well-known means, such as the crank, or lever and pawl.

The four units of the device may be conveniently fastened together at suitable distances by the top members 31a and a movable conveyor, such as indicated by the rolls 28, is provided running the length of the device, said rolls being grounded by any convenient means such as indicated at 33. A positioning or measuring gauge 32 may also be applied to correctly position the container or other object to be welded.

The conveyor indicated by the rolls 28 may be of any suitable construction, such as mechanically operated, in which case the rolls may be operated by a suitable train of gearing (not shown), or in the case where a small welding device is used, the rolls may be individually mounted, in which case the articles to be welded must be advanced manually over the rolls.

In operation, an article to be welded is correctly positioned on the conveyor. Saddles 6 and 17 are positioned; the arms 10 and 15, and the arms 32 and 33 may be also adjusted to correctly gauge the seam to be welded with reference to the welding tools 5 and 18, and the stops are moved into position, in the case of a container of uneven size, so as to limit the inwardmost position of the saddles. In case the container is of constant height, the cross member 7 may be locked in place by the means 34, 35, but in case it is not of constant height, in which case the arms 32 and 33 are used, the cross member 7 is not locked in place, it being kept in following relation to the container by means of the counterweights 25.

The welding mechanism is started, the conveyor is set in motion, and the container passes between the first unit, thereby welding two seams. As the container passes along the conveyor, it is repositioned at each unit so that the four edges at the top and the four edges at the bottom are completely welded by the time it passes completely through the device.

It is to be understood that the embodiment shown is merely by way of illustration and not by way of limitation as many and various forms of the device will occur to those skilled in the art.

I claim:

1. In a device of the character described, the combination with a support, a conveyor adapted to feed the article to be welded to the device, a cross support, vertically adjustable on said first named support a welding head loosely and adjustably mounted on said cross support and horizontally adjustable thereon and carrying welding means, and guiding means on said welding head for vertically and horizontally moving said support and head and adapted to cooperate with the article to be welded whereby the welding means is always moved in a predetermined manner with respect to said article.

2. In a welding device, the combination of a support, a plurality of grounded conveyor supporting means pivotally mounted adjacent said support for movably supporting an article to be welded adjacent said support whereby said article may be readily movable past said support, a supporting member mounted for vertical movement on said support, means cooperating with said supporting member for yieldably maintaining said supporting member in selected positions on said support, a welding head mounted for horizontal movement on said supporting member, means on said supporting member cooperating with said welding head for selectively positioning said welding head on said supporting member, a welding tool carried by said welding head, a drum carried by said support for storing conductor means secured to said welding tool, and means on said welding head adapted to have cooperative engagement with a portion of an article to be welded whereby said welding tool is movable in a vertical and horizontal direction to be operative in a predetermined path on said article as said article is moved along said conveyor means.

3. In a welding device, the combination of a support, a plurality of grounded conveyor supporting means pivotally mounted adjacent said support for movably supporting an article to be welded adjacent said support whereby said article may be readily movable past said support, a supporting member mounted for vertical movement on said support, means cooperating with said supporting member for yieldably maintaining said supporting member in selected positions on said support, a welding head mounted for horizontal movement on said supporting member, means on said supporting member cooperating with said welding head for selectively moving said welding head on said supporting member to a predetermined position, means on said supporting member cooperating with said welding head for yieldably maintaining said welding head in selected positions on said supporting member, a welding tool carried by said welding head, a drum carried by said support for storing conductor means secured to said welding tool, and means on said welding head adapted to have cooperative engagement with a portion of an article to be welded whereby said welding tool is movable in a vertical and horizontal direction to be operative in a predetermined path on said article as said article is moved along said conveyor means.

4. In a welding device, the combination of a support, a plurality of grounded conveyor supporting means pivotally mounted adjacent said support for movably supporting an article to be welded adjacent said support whereby said article may be readily movable past said support, a supporting member mounted for vertical movement on said support, means cooperating with said supporting member for yieldably maintaining said supporting member in selected positions on said support, welding heads mounted for horizontal movement on said supporting member, means on said supporting member cooperating with said welding heads for selectively positioning said welding heads on said supporting member, means on said last named means for limiting the relative position between said welding heads, a welding tool carried by each of said welding heads, revoluble drums carried by said support for storing conductor means for each of said welding tools, and means on each of said welding heads adapted to have cooperative engagement with a portion of an article to be welded whereby said welding tools are movable in vertical and horizontal direction to be operative in predetermined paths on said article as said article is moved along said conveyor.

5. In a welding device, the combination of a support, a plurality of grounded conveyor supporting means pivotally mounted adjacent said support for movably supporting an article to be welded adjacent said support whereby said article may be readily movable past said support, a supporting member mounted for vertical movement on said support, means cooperating with said supporting member for yieldably maintaining said supporting member in selected positions on said support, welding heads mounted for horizontal movement on said supporting member, means on said supporting member cooperating with said welding heads for selectively positioning said welding heads on said supporting member, means on said last named means for limiting the relative position between said welding heads, a welding tool carried by each of said welding heads, revoluble drums carried by said support for storing conductor means for each of said welding tools, and means on each of said welding heads adapted to have cooperative engagement with a portion of an article to be welded whereby said welding tools are movable in a vertical and horizontal direction to be operative in predetermined paths on said article as said article is moved along said conveyor, and means on said supporting member cooperating with each of said welding heads whereby said welding heads are yieldably urged toward each other.

6. In a welding device, the combination of spaced supports, a plurality of grounded conveyor supporting means pivotally mounted adjacent said supports and extending therebetween for movably supporting an article to be welded adjacent said supports whereby said article may be readily movable past said supports, a supporting member mounted for vertical movement on said supports and disposed transversely of said conveyor means, means cooperating with said supporting member for yieldably maintaining said supporting member in selected positions on said supports, a welding head mounted for horizontal movement on said supporting member, means on said supporting member cooperating with said welding head for selectively positioning said welding head on said supporting member, a welding tool carried by said welding head, a drum carried by said supports for storing conductor means secured to said welding tool, and means on said welding head adapted to have cooperative engagement with a portion of an article to be welded whereby said welding tool is movable in a vertical and horizontal direction to be operative in a predetermined path on said article as said article is moved along said conveyor means.

7. In a welding device, the combination of spaced supports, a plurality of grounded conveyor supporting means pivotally mounted adjacent said supports and extending therebetween for movably supporting an article to be welded adjacent said supports whereby said article may be readily movable past said welding heads, a supporting member mounted for vertical movement on said supports and disposed transversely of the conveyor means, means cooperating with said supporting member for yieldably maintaining said supporting member in selected position on said supports, welding heads mounted for horizontal movement on said supporting member, means on said supporting member cooperating with said welding heads for selectively positioning said welding heads on said supporting member, means on said last named means for limiting the relative position between said welding heads, a welding tool carried by said welding heads, revoluble drums carried by said supports for supporting conductor means for each of said welding tools, means on each of said welding heads adapted to have cooperative engagement with a portion of an article to be welded whereby said welding tools are movable in a vertical and horizontal direction to be operative in predetermined paths on said article as said article is moved along said conveyor, and means on said supporting member cooperating with each of said welding heads whereby said welding heads are yieldably urged toward each other.

Signed at Cleveland, Ohio, this 25th day of April, 1927.

RAY B. WEEKS.